W. H. McLAUGHLIN.
FASTENING MEANS.
APPLICATION FILED MAR. 26, 1918.
1,281,183.
Patented Oct. 8, 1918.
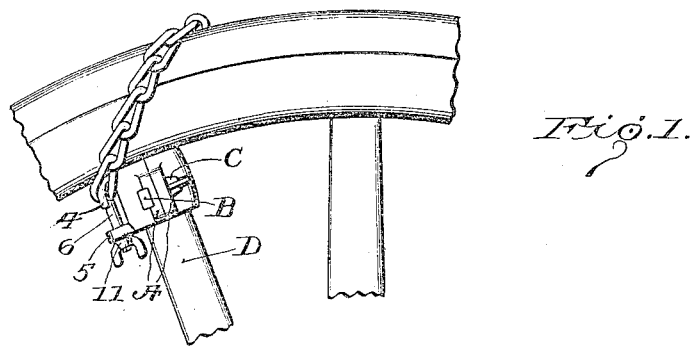
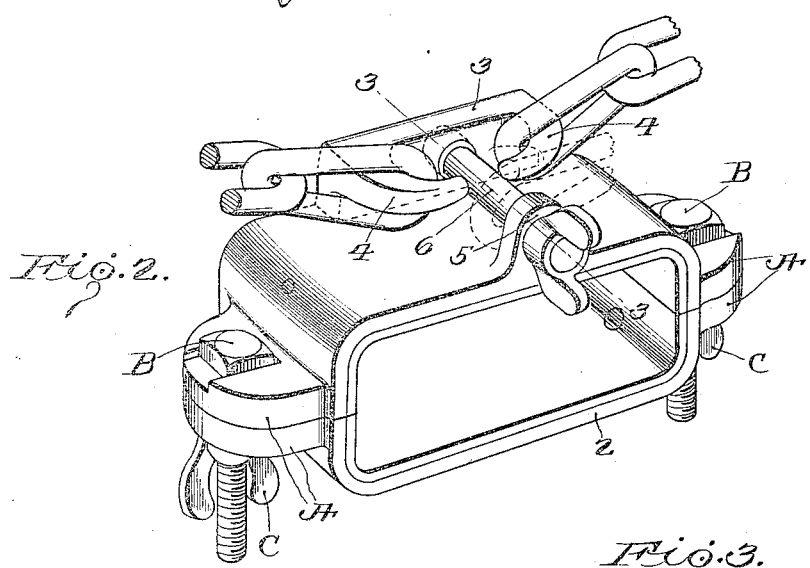
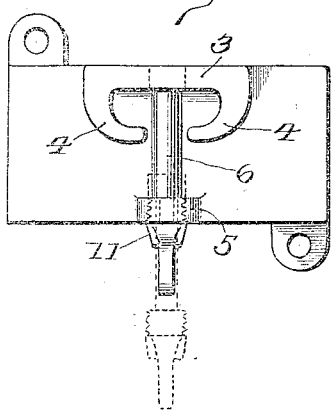
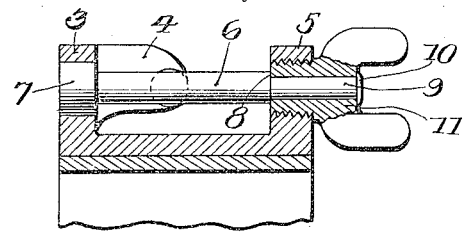
Inventor
William H. McLaughlin
By W. H. Babcock & Son
Attorneys

UNITED STATES PATENT OFFICE.

WILLIAM H. McLAUGHLIN, OF HARTFORD, CONNECTICUT, ASSIGNOR TO CASSIUS S. CHASE, OF HARTFORD, CONNECTICUT.

FASTENING MEANS.

1,281,183.	Specification of Letters Patent.	Patented Oct. 8, 1918.

Application filed March 26, 1918. Serial No. 224,772.

*To all whom it may concern:*

Be it known that I, WILLIAM H. McLAUGHLIN, a citizen of the United States, residing at Hartford, in the county of Hartford and State of Connecticut, have invented certain new and useful Improvements in Fastening Means, of which the following is a specification.

This invention relates to fastening means or connecting devices, preferably mounted on a plate, which plate may form one of the members of a clamp or may be used singly with any usual means for anchoring it fixidly in position. The primary use in view by applicant is in connection with anti-skidding chains of the anchored type, the plate being fixedly mounted on some part of the wheel to turn therewith, preferably the spokes or felly.

Heretofore it has been usual to provide a plate as above with a closed eye and to connect the terminal links of the chain to said eye by a connecting device, which formed a separate unit, but this is objectionable, its two principal disadvantages being that the connectors had to be at least two in number and were quite easily lost. Also open hooks have been tried, the terminal link of each end of the chain being passed over the ends of its respective hooks, but this has proved unsatisfactory for the reason that the cross-chains stretch a little in actual use, become loose and fly off of the hooks, with resultant risk of damages to the driving mechanism in addition to the frequent loss of cross-chains.

The present invention has for its object to provide a connecting device which will combine the advantages of the closed eye type, with the advantage of the open hook type, while avoiding the disadvantages of both, that is to provide a device having two hooks over which the terminal links of the cross-chain may be slipped in combination with means for closing the opening between the free ends of said hooks against the egress or ingress of a chain link or other endless article, said means being so formed and constructed that it cannot be accidently separated and lost, and can only be separated intentionally by hard work with a file or chisel.

In the accompanying drawings:

Figure 1 represents a side elevation of a portion of a wheel with a device embodying my invention being applied thereto;

Fig. 2, a perspective view of a clamp embodying my invention, with the terminal links of a chain applied to the respective hooks thereof, the keeper or pin being closed.

Fig. 3, a cross-sectional view on line 3—3 of Fig. 2, taken through plate 1 only; and Fig. 4, a plan view of a modified form of plate, the keeper or pin being shown in dotted lines in open or withdrawn position.

Referring now in detail to the drawings 1 designates one plate 2 the other plate of the clamp, both of said plates being provided with perforated end flanges A to receive bolts B on the threaded ends of which the wing nuts C are to be turned and tightened up to draw the plates 1 and 2 tightly together on some intervening object, for example, the spoke D of an automobile truck wheel.

Both of these plates 1 and 2 are provided with a rubber treated textile fabric lining E to guard against marring the spoke D or other part on which they may be mounted.

The plate 1 is provided preferably near one edge with a preferably longitudinal lug 3, which is preferably integral with said plate.

This lug 3 is perforated at its central point and provided with two hooks 4, preferably formed integral with it, the hooks being arranged parallel to, and at an interval from, the face of plate 1 and have their free ends presented toward, or opposed to, each other and extending to a line drawn at right angles to said lug 3, parallel with the face of plate 1 and touching the edge of the wall of said perforation, so that anything which will snugly fit in said perforation will also pass between the free ends of said hooks 4.

Said plate 1 is also provided with a lug 5 near its opposite edge and preferably, intersected by the two lines above described.

This lug 5 is provided with a hole, the wall of which is preferably screw-threaded, and the diameter of which is less than the diameter of the perforation in lug 3. The hole in lug 5 and perforation in lug 3 will preferably have a common axial line, as shown.

A pin or keeper 6 having an enlarged portion 7, which may be integral, and which is of such size as to just fit snugly in the perforation in lug 3, is provided with a shoulder 8 and a stem 9 extending beyond said shoulder.

In assembling the pin 6 is inserted, with the stem 9 first, through the perforation in lug 3 and the hole in lug 5 until the enlarged portion 7 engages against the inner face of lug 5, when a locking device 11, preferably a winged nut, provided with an external screw-thread to engage the thread in the wall of the hole in lug 5, is passed over the stem 9, the extreme end of which is then to be upset as at 10.

The relation of the diameter of the portion 7 and the stem of the pin or keeper 6 will be such that, although the portion 7 may be passed between the free ends of the hooks 4, the stem of the pin 6, when in normal position will be so colse to the free ends of both of said books as to prevent the removal therefrom or application thereto of a chain link or other endless article, so that said hooks will be closed against the ingress or egress of such articles.

In operation, to move the keeper or pin 6 to open the hooks, the nut 11 will be turned out, engaging with its outer face the inner face of the upset portion 10 and acting on it to pull the pin 7 out until the thread of the nut 11 is free of the threads in lug 5. The pin 6 is then shoved outward in the same direction between the ends of the hooks 4 until sufficient clearance has been provided between its inner end and the free ends of the hooks 4 to permit the application or removal of the terminal links F of the chain G, when the pin is to be shoved inward until the thread of nut 11 engages the thread of lug 5, when nut 11 will be turned in until the pin is locked in normal position.

In case one or both of said hooks 4 should be broken or in some other emergency, one or both ends of the chain G or other flexible element can be slipped over the end of the pin 6, which would then be locked in normal position and thus both ends of the chain or other element would be anchored to the plate, as shown in dotted lines in Fig. 2. Thus, while the function of the pin 6 is primarily as a keeper or guard for the hooks, it is also capable of being used as a positive anchoring element, though such use would only be called upon in an emergency. This applies to both forms illustrated, as well as many others that might be shown.

In the modification shown in Fig. 4, a felly plate 12 having perforated lugs 13 to receive lag screws, not shown, to fasten it the felly H of the wheel, or some other object is substituted in the place of the clamp-plate 1. Otherwise, the construction, assembly and operation are the same as in the preferred form.

Having thus described my invention, what I claim as new and desire to secure by Letters Patent is:

1. A plate having a portion adapted to receive an element in combination with a pin adjustable with relation to said plate to prevent the separation of said element therefrom, and means for locking said pin in normal position.

2. A plate having a portion adapted to receive an element in combination with a pin having locking means and being adjustable with relation to said plate to prevent the separation therefrom of said element, said pin being so formed that it cannot be separated from said plate so long as said locking means remains on said pin.

3. A plate provided with two opposed hooks with their free ends separated from said plate and at an interval from each other, said hooks being adapted to receive the terminal parts of a flexible element in combination with a pin slidably mounted on said plate and normally lying between the free ends of said hooks to close the interval between them against the egress or ingress of said terminal parts, and mens for locking said pin in normal position, said pin being adapted to receive one or more of said terminal parts in case of an emergency.

4. A plate provided with two opposed hooks with their free ends separated from said plate and at an interval from each other, said hooks being adapted to receive the terminal parts of a flexible element, in combination with a keeper movably mounted with relation to said hooks and adapted to receive the said terminal parts, and means for locking said keeper in normal position.

5. A plate provided with a hook having its free ends at an interval therefrom and adapted to receive one of the terminal parts of a flexible element, in combination with a keeper movably mounted with respect to said hook and normally closing the same against the egress or ingress of one of said terminal parts, said keeper being adapted to also receive and anchor one of the terminal parts of a flexible element, and means for locking said keeper in normal position.

6. A plate provided with a hook having its free end at an interval therefrom and adapted to receive one of the terminal parts of a flexible element, in combination with a keeper mounted on said plate and movable with respect to said hook and normally closing the same against the egress or ingress of one of said terminal parts, said keeper being adapted to also receive one of the terminal parts of a flexible element, and means for locking said keeper in normal position, which keeper is inseparable from said plate so long as said means remain on said keeper.

7. A plate provided with a projection adapted to receive an element, in combination with a keeper normally guarding said projection against the removal therefrom of said element, and means for locking said keeper in normal position, said keeper being adapted to receive and anchor an element and being movably mounted with relation to said projection.

In testimony whereof, I have signed my name to this specification.

WILLIAM H. McLAUGHLIN.

Copies of this patent may be obtained for five cents each, by addressing the "Commissioner of Patents, Washington, D. C."